US008831759B2

(12) United States Patent
Breebaart et al.

(10) Patent No.: US 8,831,759 B2
(45) **Date of Patent: *Sep. 9, 2014**

(54) AUDIO CODING

(75) Inventors: Dirk Jeroen Breebaart, Eindhoven (NL); Arnoldus Werner Johannes Oomen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2385 days.

This patent is subject to a terminal disclaimer.

(21) Appl. No.: 11/627,584

(22) Filed: Jan. 26, 2007

(65) Prior Publication Data

US 2007/0127729 A1 Jun. 7, 2007

Related U.S. Application Data

(63) Continuation of application No. 10/545,096, filed as application No. PCT/IB2004/050085 on Feb. 9, 2004, now Pat. No. 7,181,019.

(30) Foreign Application Priority Data

Feb. 11, 2003 (EP) .................................... 03100278

(51) Int. Cl.

| | |
|---|---|
| ***G06F 17/00*** | (2006.01) |
| ***G10L 19/008*** | (2013.01) |
| *H04S 1/00* | (2006.01) |

(52) U.S. Cl.
CPC .......... *G10L 19/008* (2013.01); *H04S 2420/03* (2013.01); *H04S 1/007* (2013.01)
USPC .......................................................... 700/94

(58) Field of Classification Search
USPC .................................. 700/94; 381/17–23, 61
See application file for complete search history.

(56) References Cited

U.S. PATENT DOCUMENTS

| | | | | |
|---|---|---|---|---|
| 5,682,461 | A | 10/1997 | Silzle et al. | |
| 7,006,636 | B2 | 2/2006 | Baumgarte et al. | |
| 2005/0053242 | A1 * | 3/2005 | Henn et al. | 381/22 |
| 2006/0023871 | A1 | 2/2006 | Shaffer et al. | |

* cited by examiner

*Primary Examiner* — Andrew C Flanders

(57) ABSTRACT

Parametric stereo coders use perceptually relevant parameters of the input signal to describe spatial properties. One of these parameters is the phase difference between the input signals (ITD or IPD). This time difference only determines the relative time difference between the input signals, without any information about how these time differences should be divided over the output signals in the decoder. An additional parameter is included in the encoded signal that describes how the ITD or IPD should be distributed between the output channels.

16 Claims, 4 Drawing Sheets

AUDIO CODING

This invention relates to audio coding.

Parametric descriptions of audio signals have gained interest during the last years, especially in the field of audio coding. It has been shown that transmitting (quantized) parameters that describe audio signals requires only little transmission capacity to re-synthesize a perceptually equal signal at the receiving end. In traditional waveform based audio coding schemes such as MPEG-LII, mp3 and AAC (MPEG-2 Advanced Audio Coding), stereo signals are encoded by encoding two monaural audio signals into one bit-stream. This encodes each channel unambiguously, but at the expense of requiring double the data that would be required to encode a single channel.

In many cases, the content carried by the two channels is predominantly monaural. Therefore, by exploiting interchannel correlation and irrelevancy with techniques such as mid/side stereo coding and intensity coding bit rate savings can be made. Encoding methods to which this invention relates involve coding one of the channels fully, and coding a parametric description of how the other channel can be derived from the fully coded channel. Therefore, in the decoder, usually a single audio signal is available that has to be modified to obtain two different output channels. In particular, parameters used to describe the second channel may include interchannel time differences (ITDs), interchannel phase difference (IPD) and interchannel level differences (ILDs).

EP-A-1107232 describes a method for encoding a stereo signal in which the encoded signal comprises information derived from one of a left channel or right channel input signal and parametric information which allows the other of the input signals to be recovered.

In the parametric representations as described in the references mentioned above, the ITDs denote the difference in phase or time between the input channels. Therefore, the decoder can generate the non-encoded channel by taking the content of the encoded channel and creating the phase difference given by the ITDs. This process incorporates a certain degree of freedom. For example, only one output channel (say, the channel that is not encoded) may be modified with the prescribed phase difference. Alternatively, the encoded output channel could be modified with minus the prescribed phase difference. As a third example, one could apply half the prescribed phase difference to one channel and minus half the prescribed phase difference to the other channel. Since only the phase difference is prescribed, the offset (or distribution) in phase shift of both channels is not fixed. Although this is not a problem for the spatial quality of the decoded sound, it can result in audible artifacts. These artifacts occur because the overall phase shift is arbitrary. It may be that the phase modification of one or both of the output channels at any one encoding timeframe is not compatible with the phase modification of the previous frame. The present applicants have found that it is very difficult to correctly predict the correct overall phase shift in the decoder and have previously described a method to restrict phase modifications according to the phase modifications of the previous frame. This is a solution for the problem that works well, but it does not remove the cause of the problem.

As described above, it has been shown to be very difficult to determine how the prescribed phase or time shift should be distributed over the two output channels at the decoder level. The following example explains this difficulty more clearly. Assume that in the decoder, the mono signal component consists of a single sinusoid. Furthermore, the ITD parameter for this sinusoid increases linearly over time (i.e., over analysis frames). In this example, we will focus on the IPD, keeping in mind that the IPD is just a linear transformation of the ITD. The IPD is only defined in the interval $[-\pi:\pi]$. FIG. 1 shows the IPD as a function of time.

Although at first sight this may seem a very theoretical example, such IPD behavior often occurs in audio recordings (for example if the frequency of the tones in the left and right channels differ by a few Hz). The basic task of the decoder is to produce two output signals out of the single input signal. These output signals must satisfy the IPD parameter. This can be performed by copying the single input signal to the two output signals and modifying the phases of the output signals individually. Assuming a symmetrical distribution of the IPD across channels, this implies that the left output channel is modified by +IPD/2, while the right output channel is phase-rotated by −IPD/2. However, this approach leads to clearly audible artifacts caused by a phase jump that occurs at time t. This can be understood with reference to FIG. 2, in which is shown the phase change that is implied on the left and right output channels at a certain time instance t−, just before the occurrence of the phase jump, and t+, just after the phase jump. The phase-changes with respect to the mono input signal are shown as complex vectors (i.e., the angle between the output and input signal depicts the phase-change of each output channel).

It will be seen that there is a large phase-inconsistency between the output signals just before and after the phase jump at time t: the vector of each output channel is rotated by almost $\pi$ rad. If the subsequent frames of the outputs are combined by overlap-add, the overlapping parts of the output signals just before and after the phase jump cancel each other. This results in click-like artifacts in the output. These artifacts arise because the IPD parameter is cyclic with a period of $2\pi$, but if the IPD is distributed across channels, the phase-change of each individual signal becomes cyclic with a period smaller than $2\pi$ (if the IPD is distributed symmetrically the phase change becomes cyclic with a period of $\pi$). The actual period of the phase change in each channel thus depends on the distribution method of IPD across channels, but it is smaller than $2\pi$, giving rise to overlap-add problems in the decoder.

Although the above example is a relatively simple case, we have found that for complex signals (with more frequency components within the same phase-modification frequency band, and with more complex behavior of the IPD parameter across time) it is very difficult to find the correct IPD distribution across output channels.

At the encoder, information specifying how to distribute the IPD across channels is available. Therefore, an aim of this invention is to preserve this information in the encoded signal without adding significantly to the size of the encoded signal.

To this end, the invention provides an encoder and related items as set forth in the independent claims of this specification.

The interchannel time difference (ITD), or phase difference (IPD) is estimated based on the relative time shift between the two input channels. On the other hand, the overall time shift (OTD), or overall phase shift (OPD) is determined by the best matching delay (or phase) between the fully-encoded monaural output signal and one of the input signals. Therefore, it is convenient to analyze the OTD (OPD) at the encoder level and add its value to the parameter bit-stream.

An advantage of such a time-difference encoding is that the OTD (OPD) needs be encoded in only a very few bits since the auditory system is relatively insensitive to overall phase changes (although the binaural auditory system is very sensitive to ITD changes).

For the problem addressed above, the OPD would have the behavior as shown in FIG. 3.

Here, the OPD basically describes the phase-change of the left channel across time, while the phase-change of the right channel is given by OPD(t)−IPD(t). Since both parameters (OPD and IPD) are cyclic with a period of $2\pi$, the resulting phase changes of the independent output channels also become cyclic with a period of $2\pi$. Thus the resulting phase-changes of both output channels across time do not show phase discontinuities that were not present in the input signals.

It should be noted that in this example, the OPD describes the phase change of the left channel, while the right channel is subsequently derived from the left channel using the IPD. Other linear combinations of these parameters can in principle be used for transmission. A trivial example would be to describe the phase-change of the right output channel with the OPD, and deriving the phase change of the left channel using the OPD and IPD. The crucial issue of this invention is to efficiently describe a pair of time-varying synthesis filters, in which the phase difference between the output channels is described with one (expensive) parameter, and an offset of the phase changes with another (much cheaper) parameter.

Embodiments of the invention will now be described in detail, by way of example, and with reference to the accompanying drawings, in which.

OVERVIEW OF THE EMBODIMENT

Figure 1:
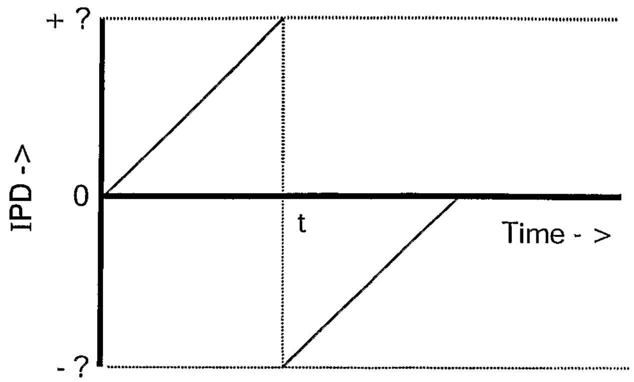
FIG. 1 illustrates the effect of the IPD increasing linearly over time, and has already been discussed.
Figure 2:
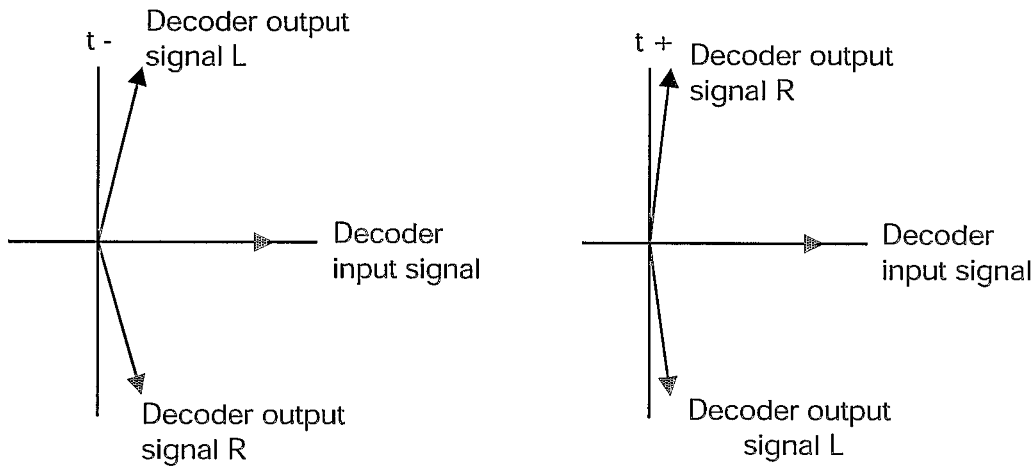
FIG. 2 illustrates the phase change of the output channels L and R with respect to the input channel just before (t−, left panel) and just after (t+, right panel) the phase jump in the IPD parameter, and has already been discussed.
Figure 3:
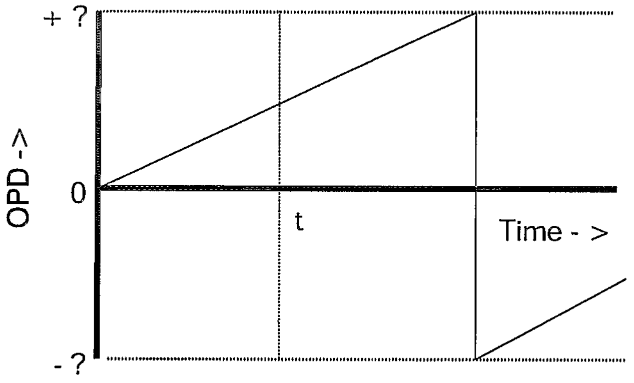
FIG. 3 illustrates the OPD parameter for the case of a linearly increasing IPD, and has already been discussed.

A spatial parameter generating stage in an embodiment of the invention takes three signals as its input. A first two of these signals, designated L and R, correspond to left and right channels of a stereo pair. Each of the channels is split up into multiple time-frequency tiles, for example, using a filterbank or frequency transform, as is conventional within this technical field. A further input to the encoder is a monaural signal S being the sum of the other signals L, R. This signal S is a monaural combination of the other signals L and R and has the same time-frequency separation as the other input signals. The output of the encoder is a bitstream containing the monaural audio signal S together with spatial parameters that are used by a decoder in decoding the bitstream.

Then the encoder calculates the interchannel time difference (ITD) by determining the time lag between the L and R input signals. The time lag corresponds to the maximum in the cross-correlation function between corresponding time/frequency tiles of the input signals L(t, f) and R(t, f), such that:

$$ITD=\arg(\max(\rho(L,R))),$$

where $\rho(L, R)$ denotes the cross-correlation function between the input signals L(t, f) and R(t, f).

The overall time shift (OTD) can be defined in two different ways: as a time difference between the sum signal S and the left input signal L, or as a time difference between the sum signal S and the right input signal R. It is convenient to measure the OTD relative to the stronger (i.e., higher energy) input signal, giving:

```
if |L| > |R|,
      OTD = arg( max( ρ( L, S) ) );
else
      OTD = arg( max( ρ( R, S) ) );
end
```

The OTD values can subsequently be quantized and added to the bitstream. It has been found that a quantization error in the order of $\pi/8$ radians is acceptable. This is a relatively large quantization error compared to error that is acceptable for the ITD values. Hence the spatial parameter bitstream contains an ILD, an ITD, an OTD and a correlation value for some or all frequency bands. Note that only for those frequency bands where an ITD value is transmitted is an OTD necessary.

The decoder determines the necessary phase-modification of the output channels based on the ITD, the OTD and the ILD, resulting in the time shift for the left channel (TSL) and for the right channel (TSR):

```
if ILD > 0 (which means |L| > |R|),
      TSL = OTD;
TSR = OTD − ITD;
else
      TSL = OTD + ITD;
TSR = OTD;
end
```

Details of the Implementation of the Embodiment

It will be understood that a complete audio coder typically takes as an input two analogue time-varying audio frequency signals, digitizes these signals, generates a monaural sum signal and then generates an output bitstream comprising the coded monaural signal and the spatial parameters. (Alternatively, the input may be derived from two already digitized signals.) Those skilled in this technology will recognize that much of the following can be implemented readily using known techniques.

Analysis Methods

In general, the encoder 10 comprises respective transform modules 20 which split each incoming signal (L,R) into sub-band signals 16 (preferably with a bandwidth which increases with frequency). In the preferred embodiment, the modules 20 use time-windowing followed by a transform operation to perform time/frequency slicing, however, time-continuous methods could also be used (e.g., filterbanks).

The next steps for determination of the sum signal 12 and extraction of the parameters 14 are carried out within an analysis module 18 and comprise:

finding the level difference (ILD) of corresponding sub-band signals 16, finding the time difference (ITD or IPD) of corresponding sub-band signals 16, and describing the amount of similarity or dissimilarity of the waveforms which cannot be accounted for by ILDs or ITDs.

Analysis of ILDs

The ILD is determined by the level difference of the signals at a certain time instance for a given frequency band. One method to determine the ILD is to measure the rms value of the corresponding frequency band of both input channels and compute the ratio of these rms values (preferably expressed in dB).

Analysis of the ITDs

The ITDs are determined by the time or phase alignment which gives the best match between the waveforms of both channels. One method to obtain the ITD is to compute the cross-correlation function between two corresponding subband signals and searching for the maximum. The delay that corresponds to this maximum in the cross-correlation function can be used as ITD value.

A second method is to compute the analytic signals of the left and right subband (i.e., computing phase and envelope values) and use the phase difference between the channels as IPD parameter. Here, a complex filterbank (e.g. an FFT) is used and by looking at a certain bin (frequency region) a phase function can be derived over time. By doing this for both left and right channel, the phase difference IPD (rather then cross-correlating two filtered signals) can be estimated.

Analysis of the Correlation

The correlation is obtained by first finding the ILD and ITD that gives the best match between the corresponding subband signals and subsequently measuring the similarity of the waveforms after compensation for the ITD and/or ILD. Thus, in this framework, the correlation is defined as the similarity or dissimilarity of corresponding subband signals which can not be attributed to ILDs and/or ITDs. A suitable measure for this parameter is the coherence, which is the maximum value of the cross-correlation function across a set of delays. However, other measures could also be used, such as the relative energy of the difference signal after ILD and/or ITD compensation compared to the sum signal of corresponding subbands (preferably also compensated for ILDs and/or ITDs). This difference parameter is basically a linear transformation of the (maximum) correlation.

Parameter Quantization

An important issue of transmission of parameters is the accuracy of the parameter representation (i.e., the size of quantization errors), which is directly related to the necessary transmission capacity and the audio quality. In this section, several issues with respect to the quantization of the spatial parameters will be discussed. The basic idea is to base the quantization errors on so-called just-noticeable differences (JNDs) of the spatial cues. To be more specific, the quantization error is determined by the sensitivity of the human auditory system to changes in the parameters. Since it is well known that the sensitivity to changes in the parameters strongly depends on the values of the parameters itself, the following methods are applied to determine the discrete quantization steps.

Quantization of ILDs

It is known from psychoacoustic research that the sensitivity to changes in the IID depends on the ILD itself. If the ILD is expressed in dB, deviations of approximately 1 dB from a reference of 0 dB are detectable, while changes in the order of 3 dB are required if the reference level difference amounts 20 dB. Therefore, quantization errors can be larger if the signals of the left and right channels have a larger level difference. For example, this can be applied by first measuring the level difference between the channels, followed by a non-linear (compressive) transformation of the obtained level difference and subsequently a linear quantization process, or by using a lookup table for the available ILD values which have a non-linear distribution. In the preferred embodiment, ILDs (in dB) are quantized to the closest value out of the following set I:

$$I=[-19\ -16\ -13\ -10\ -8\ -6\ -4\ -2\ 0\ 2\ 4\ 6\ 8\ 10\ 13\ 16\ 19]$$

Quantization of the ITDs

The sensitivity to changes in the ITDs of human subjects can be characterized as having a constant phase threshold. This means that in terms of delay times, the quantization steps for the ITD should decrease with frequency. Alternatively, if the ITD is represented in the form of phase differences, the quantization steps should be independent of frequency. One method to implement this would be to take a fixed phase difference as quantization step and determine the corresponding time delay for each frequency band. This ITD value is then used as quantization step. In the preferred embodiment, ITD quantization steps are determined by a constant phase difference in each subband of 0.1 radians (rad). Thus, for each subband, the time difference that corresponds to 0.1 rad of the subband center frequency is used as quantization step.

Another method would be to transmit phase differences which follow a frequency-independent quantization scheme. It is also known that above a certain frequency, the human auditory system is not sensitive to ITDs in the fine structure waveforms. This phenomenon can be exploited by only transmitting ITD parameters up to a certain frequency (typically 2 kHz).

A third method of bitstream reduction is to incorporate ITD quantization steps that depend on the ILD and/or the correlation parameters of the same subband. For large ILDs, the ITDs can be coded less accurately. Furthermore, if the correlation it very low, it is known that the human sensitivity to changes in the ITD is reduced. Hence larger ITD quantization errors may be applied if the correlation is small. An extreme example of this idea is to not transmit ITDs at all if the correlation is below a certain threshold.

Quantization of the Correlation

The quantization error of the correlation depends on (1) the correlation value itself and possibly (2) on the ILD. Correlation values near +1 are coded with a high accuracy (i.e., a small quantization step), while correlation values near 0 are coded with a low accuracy (a large quantization step). In the preferred embodiment, a set of non-linearly distributed correlation values (r) are quantized to the closest value of the following ensemble R:

$$R=[1\ 0.95\ 0.9\ 0.82\ 0.75\ 0.6\ 0.3\ 0]$$

and this costs another 3 bits per correlation value.

If the absolute value of the (quantized) ILD of the current subband amounts 19 dB, no ITD and correlation values are transmitted for this subband. If the (quantized) correlation value of a certain subband amounts zero, no ITD value is transmitted for that subband.

In this way, each frame requires a maximum of 233 bits to transmit the spatial parameters. With an update framelength of 1024 samples and a sampling rate of 44.1 kHz, the maximum bitrate for transmission amounts less than 10.25 kbit/s [233*44100/1024=10.034 kbit/s]. (It should be noted that using entropy coding or differential coding, this bitrate can be reduced further.)

A second possibility is to use quantization steps for the correlation that depend on the measured ILD of the same subband: for large ILDs (i.e., one channel is dominant in terms of energy), the quantization errors in the correlation become larger. An extreme example of this principle would be to not transmit correlation values for a certain subband at all if the absolute value of the IID for that subband is beyond a certain threshold.

Figure 4:
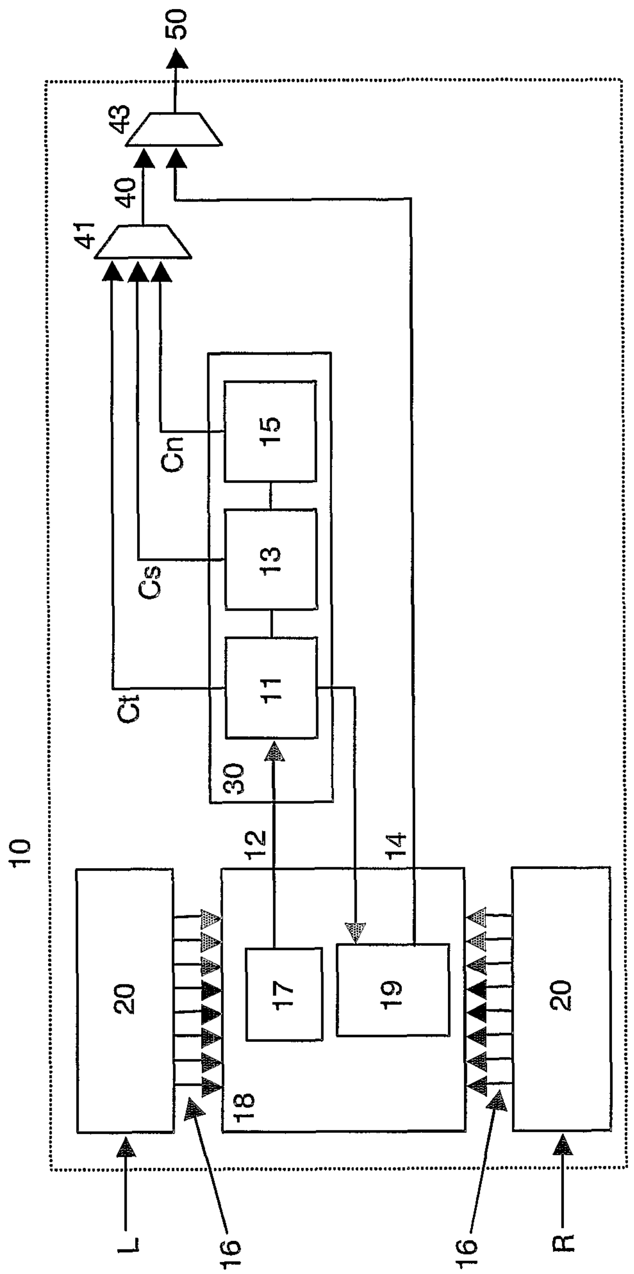
FIG. 4 is a hardware block diagram of an encoder embodying of the invention.

With reference to FIG. 4, in more detail, in the modules 20, the left and right incoming signals are split up in various time frames (2048 samples at 44.1 kHz sampling rate) and windowed with a square-root Hanning window. Subsequently, FFTs are computed. The negative FFT frequencies are discarded and the resulting FFTs are subdivided into groups or subbands 16 of FFT bins. The number of FFT bins that are combined in a subband g depends on the frequency: at higher frequencies more bins are combined than at lower frequencies. In the current implementation, FFT bins corresponding to approximately 1.8 ERBs are grouped, resulting in 20 subbands to represent the entire audible frequency range. The resulting number of FFT bins S[g] of each subsequent subband (starting at the lowest frequency) is:

S=[4 4 4 5 6 8 9 12 13 17 21 25 30 38 45 55 68 82 100 477]

Thus, the first three subbands contain 4 FFT bins, the fourth subband contains 5 FFT bins, etc. For each subband, the analysis module 18 computes corresponding ILD, ITD and correlation (r). The ITD and correlation are computed simply by setting all FFT bins which belong to other groups to zero, multiplying the resulting (band-limited) FFTs from the left and right channels, followed by an inverse FFT transform. The resulting cross-correlation function is scanned for a peak within an interchannel delay between −64 and +63 samples. The internal delay corresponding to the peak is used as ITD value, and the value of the cross-correlation function at this peak is used as this subband's interaural correlation. Finally, the ILD is simply computed by taking the power ratio of the left and right channels for each subband.

Generation of the Sum Signal

The analyzer 18 contains a sum signal generator 17. The sum signal generator generates a sum signal that is an average of the input signals. (In other embodiments, the additional processing may be carried out in generation of the sum signal, including, for example, phase correction. If necessary, the sum signal can be converted to the time domain by (1) inserting complex conjugates at negative frequencies, (2) inverse FFT, (3) windowing, and (4) overlap-add.

Given the representation of the sum signal 12 in the time and/or frequency domain as described above, the signal can be encoded in a monaural layer 40 of a bitstream 50 in any number of conventional ways. For example, a mp3 encoder can be used to generate the monaural layer 40 of the bitstream. When such an encoder detects rapid changes in an input signal, it can change the window length it employs for that particular time period so as to improve time and or frequency localization when encoding that portion of the input signal. A window switching flag is then embedded in the bitstream to indicate this switch to a decoder that later synthesizes the signal.

In the preferred embodiment, however, a sinusoidal coder 30 of the type described in WO 01/69593-a1 is used to generate the monaural layer 40. The coder 30 comprises a transient coder 11, a sinusoidal coder 13 and a noise coder 15. The transient coder is an optional feature included in this embodiment.

When the signal 12 enters the transient coder 11, for each update interval, the coder estimates if there is a transient signal component and its position (to sample accuracy) within the analysis window. If the position of a transient signal component is determined, the coder 11 tries to extract (the main part of) the transient signal component. It matches a shape function to a signal segment preferably starting at an estimated start position, and determines content underneath the shape function, by employing for example a (small) number of sinusoidal components and this information is contained in the transient code CT.

The sum signal 12 less the transient component is furnished to the sinusoidal coder 13 where it is analyzed to determine the (deterministic) sinusoidal components. In brief, the sinusoidal coder encodes the input signal as tracks of sinusoidal components linked from one frame segment to the next. The tracks are initially represented by a start frequency, a start amplitude and a start phase for a sinusoid beginning in a given segment—a birth. Thereafter, the track is represented in subsequent segments by frequency differences, amplitude differences and, possibly, phase differences (continuations) until the segment in which the track ends (death) and this information is contained in the sinusoidal code CS.

The signal less both the transient and sinusoidal components is assumed to mainly comprise noise and the noise analyzer 15 of the preferred embodiment produces a noise code CN representative of this noise. Conventionally, as in, for example, WO 01/89086-A1, a spectrum of the noise is modeled by the noise coder with combined AR (auto-regressive) MA (moving average) filter parameters (pi,qi) according to an Equivalent Rectangular Bandwidth (ERB) scale. Within a decoder, the filter parameters are fed to a noise synthesizer, which is mainly a filter, having a frequency response approximating the spectrum of the noise. The synthesizer generates reconstructed noise by filtering a white noise signal with the ARMA filtering parameters (pi,qi) and subsequently adds this to the synthesized transient and sinusoid signals to generate an estimate of the original sum signal.

Figure 6:
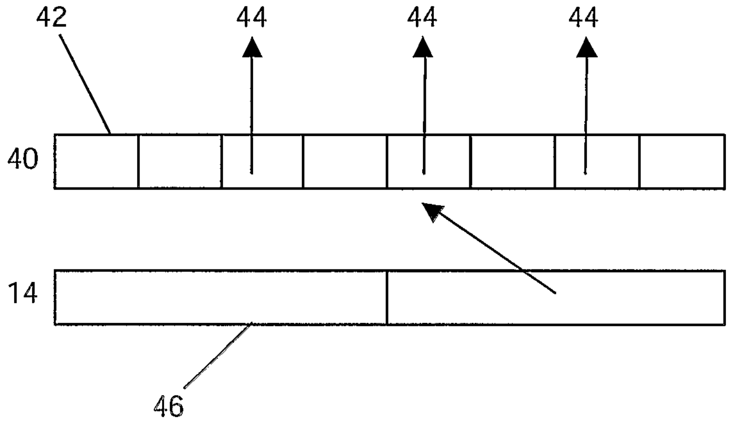
FIG. 6 shows transient positions encoded in respective sub-frames of a monaural signal and the corresponding frames of a multi-channel layer.

The multiplexer 41 produces the monaural audio layer 40 which is divided into frames 42 which represent overlapping time segments of length 16 ms and which are updated every 8 ms, FIG. 6. Each frame includes respective codes CT, CS and CN and in a decoder the codes for successive frames are blended in their overlap regions when synthesizing the monaural sum signal. In the present embodiment, it is assumed that each frame may only include up to one transient code CT and an example of such a transient is indicated by the numeral 44.

The analyzer 18 further comprises a spatial parameter layer generator 19. This component performs the quantization of the spatial parameters for each spatial parameter frame as described above. In general, the generator 19 divides each spatial layer channel 14 into frames 46, which represent overlapping time segments of length 64 ms and which are updated every 32 ms, FIG. 4. Each frame includes an IID, an ITD, an OTD and a correlation value (r) and in the decoder the values for successive frames are blended in their overlap regions to determine the spatial layer parameters for any given time when synthesizing the signal.

In the preferred embodiment, transient positions detected by the transient coder 11 in the monaural layer 40 (or by a corresponding analyzer module in the summed signal 12) are used by the generator 19 to determine if non-uniform time segmentation in the spatial parameter layer(s) 14 is required. If the encoder is using an mp3 coder to generate the monaural layer, then the presence of a window switching flag in the monaural stream is used by the generator as an estimate of a transient position.

Finally, once the monaural 40 and spatial representation 14 layers have been generated, they are in turn written by a multiplexer 43 to a bitstream 50. This audio stream 50 is in turn furnished to e.g. a data bus, an antenna system, a storage medium etc.

Figure 5:
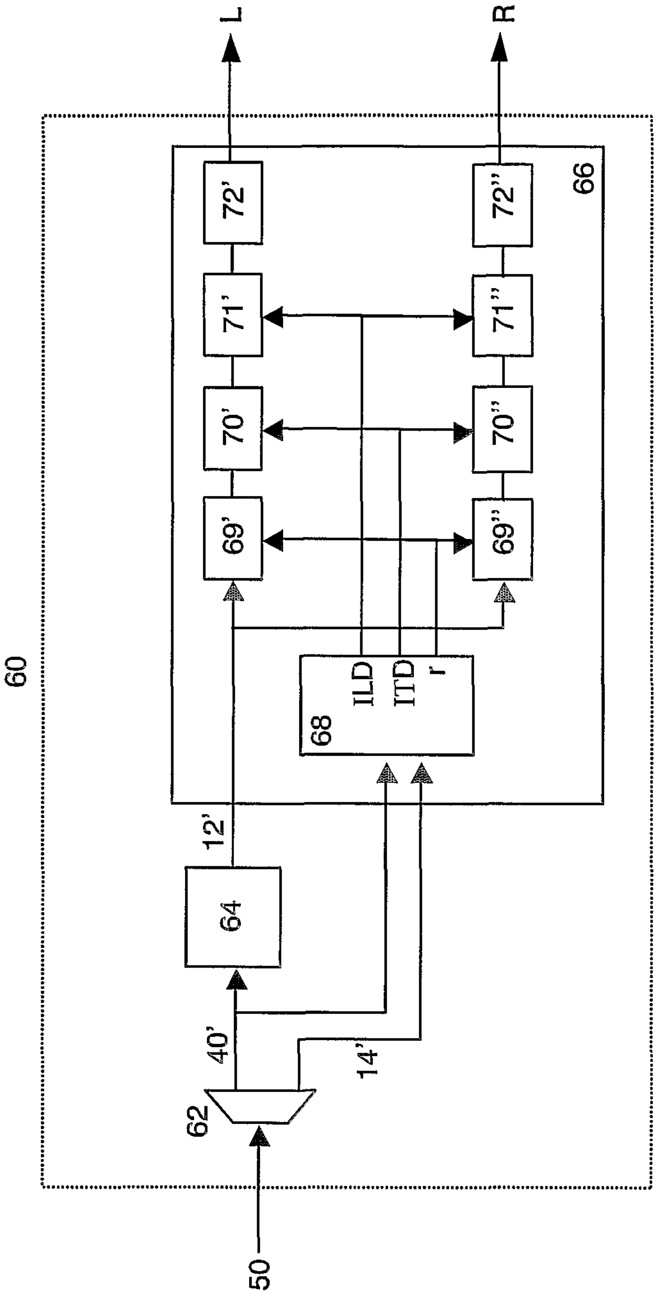
FIG. 5 is a hardware block diagram of a decoder embodying of the invention.

Referring now to FIG. 5, a decoder 60 for use in combination with an encoder described above includes a de-multiplexer 62 which splits an incoming audio stream 50 into the monaural layer 40' and in this case a single spatial representation layer 14'. The monaural layer 40' is read by a conventional synthesizer 64 corresponding to the encoder which generated the layer to provide a time domain estimation of the original summed signal 12'.

Spatial parameters 14' extracted by the de-multiplexer 62 are then applied by a post-processing module 66 to the sum signal 12' to generate left and right output signals. The post-processing module of the preferred embodiment also reads the monaural layer 14' information to locate the positions of transients in this signal and processes them appropriately. This is, of course, the case only where such transients have been encoded in the signal. (Alternatively, the synthesizer 64 could provide such an indication to the post-processor; however, this would require some slight modification of the otherwise conventional synthesizer 64.)

Within the post-processor 66, it is assumed that a frequency-domain representation of the sum signal 12' as described in the analysis section is available for processing. This representation may be obtained by windowing and FFT operations of the time-domain waveform generated by the synthesizer 64. Then, the sum signal is copied to left and right output signal paths. Subsequently, the correlation between the left and right signals is modified with a decorrelator 69', 69" using the parameter r.

Subsequently, in respective stages 70', 70", each subband of the left signal is delayed by the value TSL and the right signal is delayed by TSR given the (quantized) from the values of OTD and ITD extracted from the bitstream corresponding to that subband. The values of TSL and TSR are calculated according to the formulae given above. Finally, the left and right subbands are scaled according to the ILD for that subband in respective stages 71', 71". Respective transform stages 72', 72" then convert the output signals to the time domain, by performing the following steps: (1) inserting complex conjugates at negative frequencies, (2) inverse FFT, (3) windowing, and (4) overlap-add.

As an alternative to the above coding scheme, there are many other possible ways in which the phase difference could be encoded. For example, the parameters might include an ITD and a certain distribution key, e.g., x. Then, the phase change of the left channel would be encoded as x*ITD, while the phase change of the right channel would be encoded as (1-x)*ITD. Clearly, many other encoding schemes can be used to implement embodiments of the invention.

It is observed that the present invention can be implemented in dedicated hardware, in software running on a DSP (Digital Signal Processor) or on a general-purpose computer. The present invention can be embodied in a tangible medium such as a CD-ROM or a DVD-ROM carrying a computer program for executing an encoding method according to the invention. The invention can also be embodied as a signal transmitted over a data network such as the Internet, or a signal transmitted by a broadcast service. The invention has particular application in the fields of Internet download, Internet radio, Solid State Audio (SSA), bandwidth extension schemes, for example, mp3PRO, CT-aacPlus (see www.codingtechnologies.com), and most audio coding schemes.

The invention claimed is:

1. A method of coding an audio signal, the method comprising:

receiving an audio input signal having at least two audio input channels;

generating a monaural signal from said audio input signal;

generating an encoded signal that includes the monaural signal and a set of parameters, said encoded signal enabling reproduction of at least two audio output signals corresponding, respectively, to said at least two audio input channels; characterized in that:

the set of parameters includes an indication of an overall shift, the overall shift being a measure of the delay between the encoded monaural output signal and one of the input audio channels.

2. The method as claimed in claim 1, wherein, for transmission, a linear combination of the overall shift and an interchannel phase or time difference is used.

3. The method as claimed in claim 1, wherein the overall shift is an overall time shift.

4. The method as claimed in claim 1, wherein the overall shift is an overall phase shift.

5. The method as claimed in claim 1, wherein the overall shift is determined by the best matching delay or phase between the fully-encoded monaural output signal and one of the input audio channels.

6. The method as claimed in claim 5, wherein the best matching delay corresponds to the maximum in the cross-correlation function between corresponding time/frequency tiles of the input signals.

7. The method as claimed in claim 1, wherein the overall shift is calculated with respect to the input signal of greater amplitude.

8. The method as claimed in claim 1, wherein the phase difference is encoded with a lesser quantization error than the overall shift.

9. An encoder for coding an audio signal, said encoder comprising:

an input for receiving an input signal, said input signal having at least two audio input channels;

means for generating a monaural signal from said audio input signal;

means for generating an encoded signal that includes the monaural signal and a set of parameters, said encoded signal enabling reproduction of at least two audio output signals corresponding, respectively, to said at least two audio input channels, characterized in that the set of parameters includes an indication of an overall shift, the overall shift being a measure of a delay between the encoded signal and one of the at least two audio input channels.

10. An apparatus for supplying an audio signal, the apparatus comprising:

an input for receiving an audio signal;

an encoder as claimed in claim 9 for encoding the audio signal to obtain an encoded audio signal; and an output for supplying the encoded audio signal.

11. A non-transitory computer-readable storage medium having stored thereon an encoded audio signal comprising:

a monaural signal derived from an audio input signal having at least two audio input channels; and a set of parameters, said monaural signal and said set of parameters enabling reproduction of at least two audio output signals corresponding, respectively, to said at least two audio input channels, characterized in that:

the set of parameters includes an indication of an overall shift, the overall shift being a measure of a delay between the encoded signal and one of the at least two audio input channels.

12. The non-transitory computer-readable storage medium as claimed in claim 11, wherein, for transmission, a linear combination of the overall shift and an interchannel phase or time difference is used.

13. A method of decoding an encoded audio signal, said encoded audio signal including a monaural signal having been formed from at least two input channels, and a set of spatial parameters, said set of spatial parameters including an indication of an overall shift, the overall shift being a measure of a delay between the encoded audio signal and one of the at least two input channels, the method comprising the steps of:

obtaining the monaural signal and the set of spatial parameters from the encoded audio signal; and generating a stereo pair of output audio signals using said monaural signal and said set of spatial parameters, said stereo pair of output audio signals being offset in time and phase by an interval specified by the set of spatial parameters.

14. A decoder for decoding an encoded audio signal, said encoded audio signal including a monaural signal having been formed from at least two input channels, and a set of spatial parameters, said set of spatial parameters including an indication of an overall shift, the overall shift being a measure of a delay between the encoded signal and one of the at least two input channels, said decoder comprising:

means for obtaining the monaural signal and the set of spatial parameters from the encoded audio signal; and means for generating a stereo pair of output audio signals using said monaural audio signal and said set of spatial parameters, said stereo pair of output audio signals being offset in time and phase by an interval specified by the set of spatial parameters.

15. The decoder as claimed in claim 14, wherein the overall shift is obtained from a linear combination of the overall shift and an interchannel time or phase difference, used for transmission.

16. An apparatus for supplying a decoded audio signal, the apparatus comprising:

an input for receiving an encoded audio signal;

a decoder as claimed in claim 14 for decoding the encoded audio signal to obtain a multi-channel output signal; and an output for supplying or reproducing the multi-channel output signal.

* * * * *